United States Patent
Zhu et al.

(10) Patent No.: US 7,899,935 B2
(45) Date of Patent: Mar. 1, 2011

(54) METHOD AND SYSTEM FOR DATA SYNCHRONIZATION

(75) Inventors: Zhongchu Zhu, Shenzhen (CN); Yongfeng Wang, Shenzhen (CN); Fei Zhou, Shenzhen (CN); Mingzhu Shi, Shenzhen (CN); Wei He, Shenzhen (CN); Yunlong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 196 days.

(21) Appl. No.: 12/249,549

(22) Filed: Oct. 10, 2008
(Under 37 CFR 1.47)

(65) Prior Publication Data

US 2009/0271653 A1     Oct. 29, 2009

Related U.S. Application Data

(63) Continuation of application No. PCT/CN2007/000995, filed on Mar. 28, 2007.

(30) Foreign Application Priority Data

Apr. 10, 2006    (CN) .......................... 2006 1 0072096

(51) Int. Cl.
*G06F 15/16* (2006.01)
(52) U.S. Cl. .......... 709/246; 709/224; 709/232; 707/102
(58) Field of Classification Search ................. 709/220, 709/224, 249, 232, 246; 719/313, 315
See application file for complete search history.

(56) References Cited

U.S. PATENT DOCUMENTS

| | | | |
|---|---|---|---|
| 6,292,803 B1 | 9/2001 | Richardson et al. | |
| 6,820,135 B1 * | 11/2004 | Dingman et al. | 709/246 |
| 7,017,162 B2 * | 3/2006 | Smith et al. | 719/328 |
| 7,117,504 B2 * | 10/2006 | Smith et al. | 719/328 |
| 7,181,731 B2 * | 2/2007 | Pace et al. | 717/136 |
| 7,546,602 B2 * | 6/2009 | Hejlsberg et al. | 719/313 |
| 2003/0217096 A1 | 11/2003 | McKelvie et al. | |
| 2005/0076098 A1 | 4/2005 | Matsubara et al. | |
| 2005/0240943 A1 * | 10/2005 | Smith et al. | 719/328 |
| 2005/0246716 A1 * | 11/2005 | Smith et al. | 719/315 |
| 2006/0173959 A1 | 8/2006 | McKelvie et al. | |

FOREIGN PATENT DOCUMENTS

| | | | |
|---|---|---|---|
| CN | 1509000 A | 6/2004 | |
| CN | 1547118 A | 11/2004 | |
| CN | 1625112 A | 6/2005 | |

* cited by examiner

*Primary Examiner* — Khanh Q Dinh

(74) *Attorney, Agent, or Firm* — Leydig, Voit & Mayer, Ltd.

(57) ABSTRACT

A data synchronization system and method. The method includes that when a change happens in a source application, data is collected from a source application based on a target application subscribing the source application and collection data is transmitted to the target application or is directly inserted to target database. The system includes data collection unit and distribution unit. The present invention may realize synchronization on demand, simultaneously reduce greatly synchronous data quantity, decrease network load, and guarantee smoothness and stabilization of network. The present invention applies to data synchronization of enterprise internal/external data systems, telecommunication networks, etc.

11 Claims, 8 Drawing Sheets

METHOD AND SYSTEM FOR DATA SYNCHRONIZATION

CROSS-REFERENCE TO RELATED APPLICATIONS

This application is a continuation of International Patent Application No. PCT/CN2007/000995, filed Mar. 28, 2007, which claims priority to Chinese Patent Application No. 200610072096.8, entitled "System for Data Synchronization and Method Thereof," filed Apr. 10, 2006, both of which are hereby incorporated by reference in their entirety.

FIELD OF THE INVENTION

The present invention relates to data synchronization technology, and in particular, to a method and a system for data synchronization based on subscription relationship.

BACKGROUND OF THE INVENTION

In the information age, large volumes of information needs to be collected, transmitted and managed; thus, strict requirements are laid on the existing information application technology. Therefore, information synchronization and information sharing are of special importance.

Data synchronization technology has been widely applied to various industries such as communication and network management, etc. For example, in telecommunication network management systems, a telecommunication network becomes more and more complex. When a network element device accesses a telecommunication network management system, the network management system needs to keep part or all of the configuration information of the network element, which is generally queried and obtained from the network element via a Man-Machine Language (MMI) command. When a user modifies the configuration information of the device via a local operation and maintenance terminal, the network management system should be able to be notified in time and then refresh its own configuration information, so as to keep consistent with the real-time data kept on the device side.

In the existing telecommunication system, a method for timed synchronization is usually employed; in other words, a network management system sends a data configuration query command to a device at a certain designated time point (for example, once per day) and refreshes its own configuration data according to the query result. This method has the following disadvantages: 1) real-time synchronization cannot be realized, and configuration modification on a network element is usually reflected to the network management system in a period of time; and 2) a query process will be carried out no matter whether configuration modification appears, and all the configuration data may be checked; thus, the data flow may be very large.

In another method, data collection and synchronization are synthetically managed and scheduled using a relational database. The relational database includes several relationship tables and other database objects, wherein each relationship table comprises several records. In the practical application of the relational database, situations in which "The existing data set is modified and then the modified data set is processed" exist in large quantities. For example, in the daily maintenance of base station device in a Code Division Multiple Access (CDMA) base station system, the object of modifying the operation data of a base station device and keeping the data in maintenance commercial database and the base station totally consistent with each other may be attained by modifying an operation and maintenance commercial database, obtaining the data in the operation and maintenance commercial database via a synchronization server as controlled by a client end device, and then synchronizing the data with a real-time database in the base station device via a socket. At present, for the data set modified, data are usually processed in the following two methods.

Method 1: All the data in all the relationship tables in the relational database are taken as the processing object. The same as the method for timed synchronization in a telecommunication system, this method is simple to realize. But, in respect that the data volume modified each time is usually small, the method in which all the data are processed each time a small part of data are modified will apparently have a low efficiency.

Method 2: All the data in the changed relationship tables are taken as the processing object. In this method, a mechanism, for example, for setting up a trigger on a relationship table and recording the modified relationship tables during a data modification process, is needed. In comparison with the first method, the realization of this method is relatively complex; moreover, redundant data that are not necessary to be processed may usually be included.

In the realization process of the invention, the inventors find that the above existing methods for data synchronization at least have the following problems:

1) The volume of data to be synchronized is too large. Timed synchronization is to synchronize all the data; for synchronization using relational database, although the above method for obtaining a minimal data variation set may be employed, the basis for determining whether to synchronize is till the variation of data. However, practically not all the changed data needs to be synchronized. Therefore, it cannot be ensured that the volume of data to be synchronized is minimized.

2) Real-time arrival of data cannot be guaranteed. Apparently, it is difficult to realize real-time synchronization of data in timed synchronization. If real-time synchronization is needed, synchronization operation must be performed all the time, such a large data transmission volume is difficult to be realized and it is uneconomical. For the method for data synchronization using relational database, no technical measure for ensuring real-time data synchronization is given in the above prior art.

3) Transaction integrity cannot be guaranteed. No matter it is timed synchronization or synchronization using relational database, the obtaining of data is ruleless and orderless. For example, during the synchronization process of data generated by operating an event, if the event comprises a plurality of steps arranged in time sequence and each step is the triggering condition of the subsequent step, when the information of these steps is synchronized to the target application, the information data of these steps obtained by the target application should be consistent with the order of information data of the steps for synchronizing the data source; otherwise, the order of information of these steps synchronized to the target application may be disturbed, thus the steps may not be executed again.

4) Data filtration and data screening cannot be realized. In the above prior art, data to be synchronized are nonselective. All the data will be synchronized, or the data will be synchronized when it is changed. Therefore, the data that should be synchronized may not be synchronized, while the data that should not be synchronized may be synchronized. As a result, the efficiency will be very low and the data transmission volume will be very large.

5) Other systems interested in changed data cannot be notified in real time. In the above prior art, data can only be synchronized to a fixed target application. Thus, once the target application is changed, it will be difficult to meet the requirement of data synchronization.

SUMMARY OF THE INVENTION

The embodiments of the invention provide a method and a system for data synchronization, thereby lowering the volume of data to be synchronized and improving the data synchronization efficiency.

A method for data synchronization according to one embodiment of the invention includes the following:

collecting data from a source application according to the source application information subscribed by a target application when change occurs in the source application data; and sending the data collected to the target application or directly inserting the data collected into a target database.

A system for data synchronization according to one embodiment of the invention includes the following:

a data collection unit, adapted to collect data from a source application, according to the source application information subscribed by a target application when a change occurs in the source application data; and a distribution unit, adapted to send the data collected by the data collection unit to the target application or directly insert the data collected into a target database.

It can be seen from the method according to the above embodiment of the invention that, in the embodiment of the invention, when a change occurs in the source application data, data is collected from a source application according to the source application information subscribed by a target application, so that a subscription relationship of the target application on the source application and the type of data to be collected will be specified, and the range of data collection will be reduced to a single source application, and even to a specific data object of the source application. Moreover, when a change occurs in the source application data, an operation of data synchronization will be triggered, so that "On-Demand Synchronization" may be realized. At the same time, because only data needed is collected, not all the data changes of the source application will cause a collection and synchronization process. Accordingly, volume of data to be synchronized may be lowered greatly, network load may be alleviated, and network smoothness and network stability may be guaranteed.

It can be seen from the system according to the above embodiment of the invention that, in the embodiment of the invention, because a data collection unit and a distribution unit are designed for data synchronization, when a change occurs in the source application data, the data collection unit will collect data from a source application according to the source application information subscribed by a target application, and the distribution unit sends the data collected to the target application or directly inserts the data collected into a target database, so that "On-Demand Synchronization" may be realized. At the same time, because only data needed is collected, not all the data changes of the source application will cause a collection and synchronization process, and thus volume of data to be synchronized may be lowered greatly, and data synchronization efficiency may be improved.

DETAILED DESCRIPTION OF THE EMBODIMENTS

The invention will now be described in detail in conjunction with the embodiments and drawings of the invention.

Figure 1:
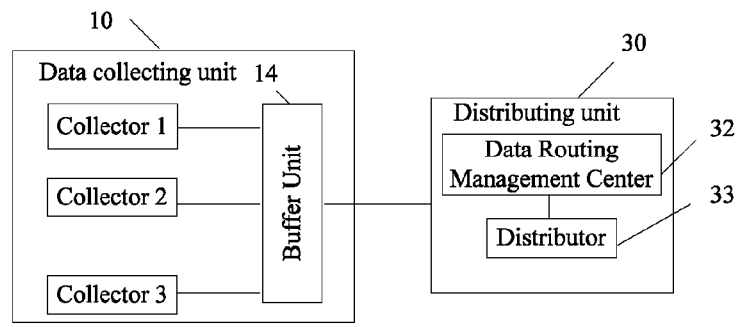
FIG. 1 is a functional block diagram of a system for data synchronization, according to one embodiment of the invention.

Referring to FIG. 1, it is a functional block diagram of a system for data synchronization, according to one embodiment of the invention.

In this embodiment, the system for data synchronization includes a data collection unit 10 and a distribution unit 30. The data collection unit 10 may include one or more collectors, for collecting data from the source application, according to the source application information subscribed by a target application when change occurs in the source application data; and in FIG. 1, there are three collectors shown. Each collector may be set to trigger a collection event when change occurs in the source application data.

The data collection unit 10 may include a buffer unit 14. The collector may write the data collected to the buffer unit 14 in the unit of transaction; in other words, a transaction ID and operation sequence number field are added to the operational procedure information of each line of collection record when the data is written to the buffer.

The collector stores the data collected to the buffer unit 14, and the data collection unit 10 notifies the distribution unit 30 to obtain the data. After the distribution unit 30 receives the notification, it obtains the data collected from the buffer unit 14 and sends the data to the corresponding target application or directly inserts the data collected into a target database.

To send the data in the buffer unit 14 to the correct target application, in this embodiment, the distribution unit 30 may include a data routing management center 32 and a distributor 33. Specifically, a data routing management center 32 is adapted to create a routing rule, the process of which will be described in detail bellow; the distributor 33 is adapted to send data to a designated target application or directly insert the data to a designated target database according to the routing rule.

The data formats supported by the target application and the source application may be different; therefore, for such a case, a mapping and converting unit may also be set in the system of the invention, for converting the source application data collected by the collector into data that can be identified by the target application, according to a preset mapping and converting rule. For example, a mapping table for performing data format conversion between a source application and different target applications may be established, respectively; thus, data format conversion may be performed between the source application and the target application according to the mapping table.

Figure 2:
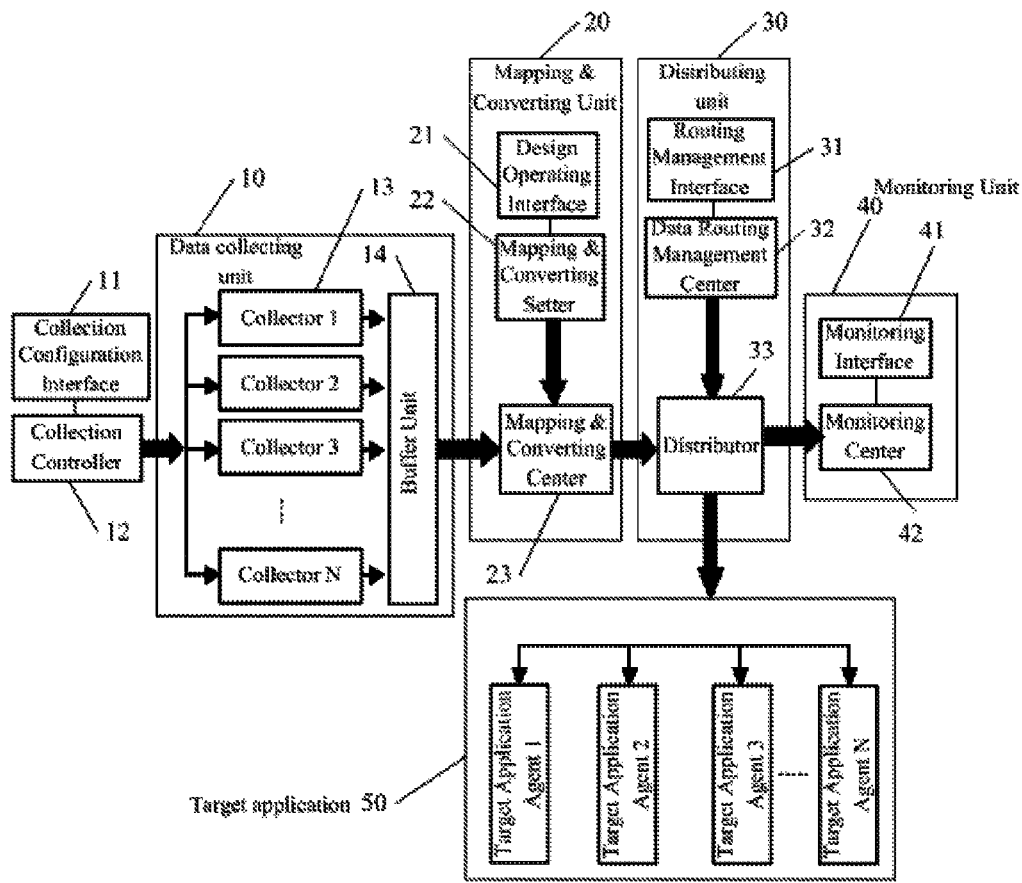
FIG. 2 is a functional block diagram of a system for data synchronization, according to one embodiment of the invention.

Therefore, referring to FIG. 2, it is a functional block diagram of the system, according to one embodiment of the invention.

As different from the system according to the embodiment of the invention shown in FIG. 1, in this embodiment, the system for data synchronization of the invention further includes a mapping and converting unit 20; in addition, to monitor system error, monitoring unit 40 may also be set. A collection controller 12 with a collection configuration interface 11 is configured with a collector 13 corresponding to each source application. The mapping and converting unit 20 may include: a mapping and converting setter 22 with a design operating interface 21, and a mapping and converting center 23. A distribution unit 30 may include: data routing management center 32 with a routing management interface 31, and a distributor 33. The monitoring unit 40 may include a monitoring center 42 with a monitoring interface 41.

The collection controller 12 uniformly manages the collectors, cooperates with the collection configuration interface 11 in configuring the data collection rule of each collector, and issues the collecting rules to a designated collector. The corresponding collecting rule may be pre-established according to the subscription information of the target application, so that the collector may collect data from the source application according to the collecting rule. The collecting rule includes target application information, information of the source application subscribed by the target application, and information of data to be collected. For example, the collecting rule may include the following contents:

1) data content to be collected: which content of which source application needs to be collected;

2) triggering condition: the change of which data content in the source application will cause data collection; and 3) filtration condition: if some contents meet or do not meet the condition, these contents will be ignored.

The collecting rule needs to be predefined, or will be modified when needed.

Figure 3:
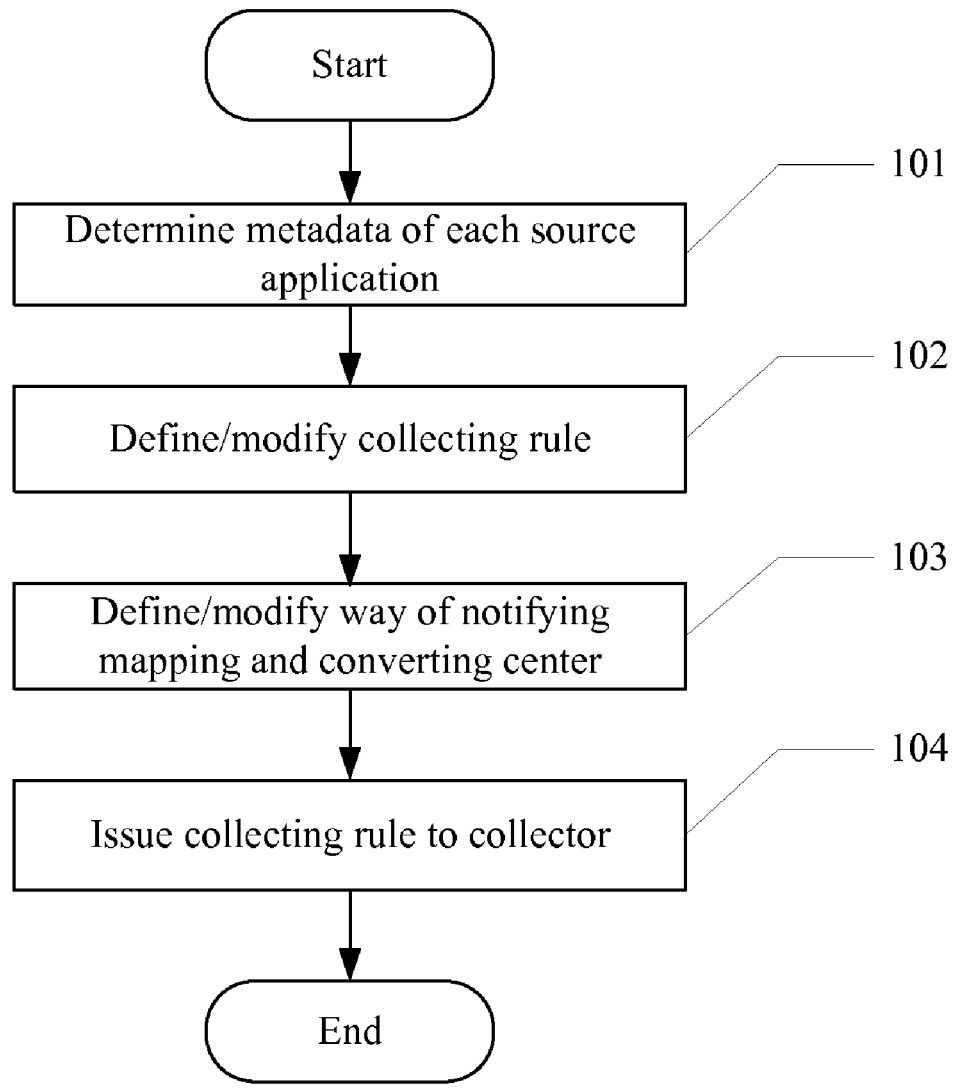
FIG. 3 is a flow chart of a process for creating a data collection rule in the method for data synchronization, according to one embodiment of the invention.

The collection configuration interface 11 cooperates with the collection controller 12 in designing the collecting rule. When the collecting rule is designed, first needs to specify the requirements of a subscriber, i.e. which source application and which data are needed by a target application 50 and when they are needed; then, a specific collecting rule is designed according to these requirements. The process for defining/modifying and issuing the collecting rule is as shown in FIG. 3.

Block 101: The metadata of each source application, i.e. the description data of the service object, is determined, where the metadata include the source application information subscribed by a target application in the collecting rule;

the metadata of each source application may be obtained by the collector of the source application via a collection control interface.

Block 102: The collecting rule is defined/modified, and the specific process includes:

the attribute of the metadata item of a service object may be selected as a subscription item, and when change occurs in the metadata item, the collector will be triggered to collect such changed data; and the metadata item of the service object is defined/modified as the content collected; in other words, the metadata item will be collected and sent by the collector.

Thus, the above subscription item and collected content constitute a basic source application information. Furthermore, a collecting and filtering condition may also be designed in the source application information; that is, the collecting and filtering condition will be defined/modified, defining that data with a certain specific condition will not be collected or only the data with these characteristics will be collected. For example, there is a customer object with level attribute and score attribute in a bank, when the level is higher than a "Bank Card" user or the score is greater than 10000, the customer data will be a customer that meets the condition; when change occurs, the records that meet the condition will be collected, and the rest record will be ignored;

Block 103: The mode in which the mapping and converting center is notified is defined/modified.

Block 104: The collecting rule is issued to the collector.

The collector may be a trigger established in a source application database table. During the above process for creating/modifying the collecting rule, the collector receives the collecting rule from the collection configuration interface 11, collects data from the source application according to the collecting rule, and writes the collected data into a buffer unit. At the same time, the data collection controller 12 is notified at the triggering by the data variation of the source application, so that data synchronization may be carried out in real time.

After the collector collects the data to the buffer unit according to the collecting rule, the data in the buffer unit will be packaged in the unit of transaction according to the transaction sequence, waiting to be obtained by the mapping and converting center.

The mapping and converting unit 20 is adapted to accomplish the data conversion between the source application and the target application 50 according to a mapping and converting rule. Specifically, the mapping and converting unit 20 obtains a subscription relationship from the mapping and converting rule, then maps and converts the collected data, according to the subscription relationship, thus converting the source application data into data that can be identified by target application 50.

The design operating interface 21 of the mapping and converting unit 20 designs a mapping and converting rule required via the mapping and converting setter 22, and issues the mapping and converting rule designed to the mapping and converting center 23.

Mapping and converting unit 20 may include a port for listening to a notification message from the collector 13.

Figure 4:
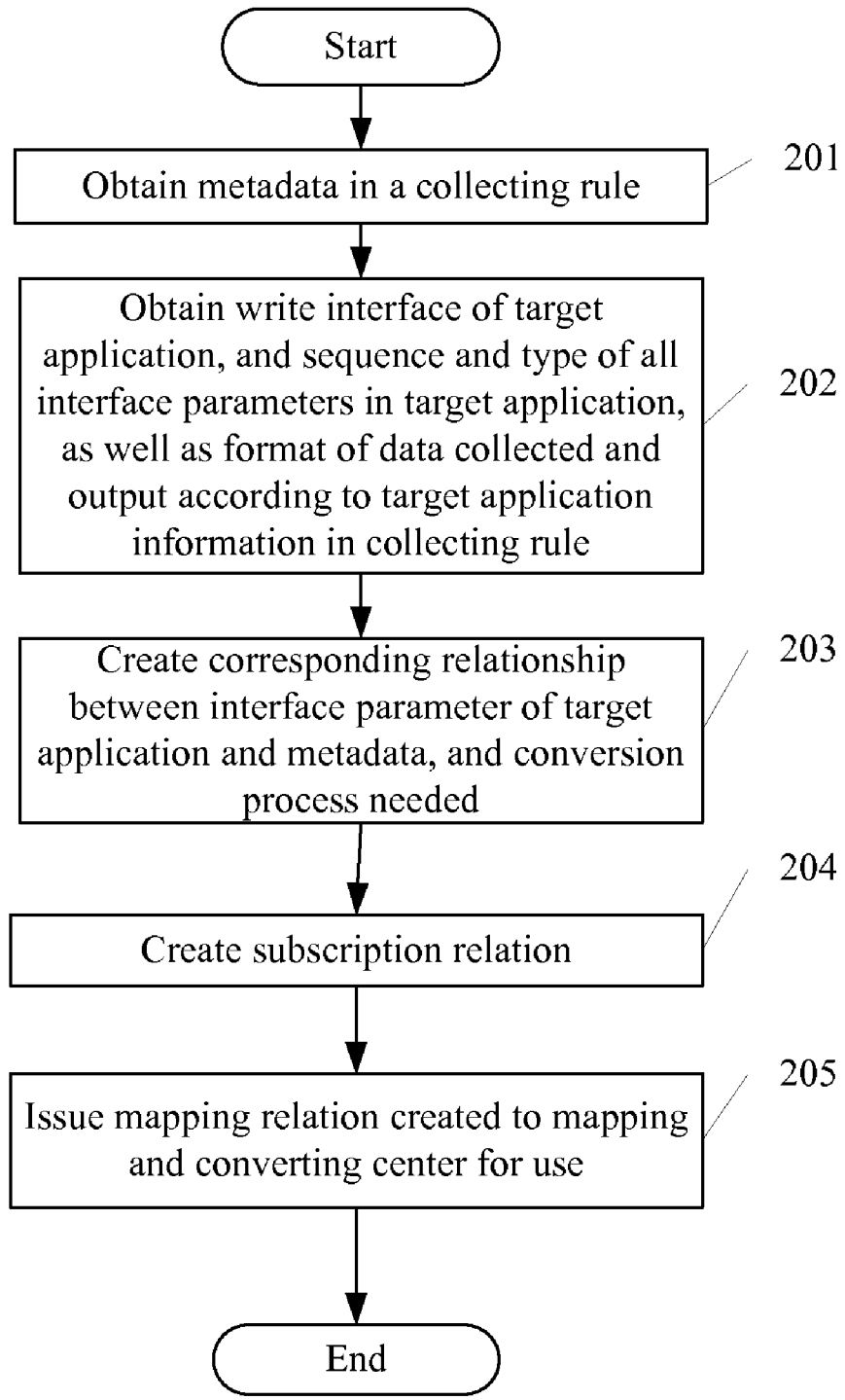
FIG. 4 is a flow chart of a process for creating a mapping and converting rule in the method for data synchronization, according to one embodiment of the invention.

Referring to FIG. 4, the process for creating a mapping and converting rule is as follows:

Block 201: The metadata in a collecting rule is obtained.

Block 202: The write interface of the target application and the sequence and type of all the interface parameters inside the target application are obtained according to the target application information in the collecting rule, and the data format that is output is collected.

Block 203: A correspondence between the interface parameter of the target application and the metadata and a conversion process needed are created.

Figure 5:
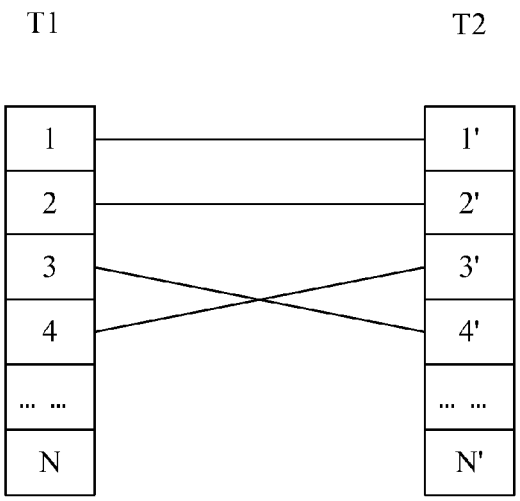
FIG. 5 is a schematic diagram of the data mapping and converting relationship between a source application and a target application in the method for data synchronization, according to one embodiment of the invention.

As shown in FIG. 5, because the data format of the source application and target application 50 may be different, if they are different, data T collected from the source application needs to be converted into data format T' that may be identified by the target application during the synchronization process.

Block 204: A subscription relationship is created; in other words, a relationship between the target application and the collecting rule is established. Thus, the destination of the data collected according to the collecting rule will be specified, i.e. the following routing computation rule will be assigned to the mapping and converting rule.

Block 205: A mapping and converting rule created is issued to the mapping and converting center for use.

The distribution unit 30 is adapted to send the data collected to target application 50 or directly insert the data collected into a target database, and it includes: a data routing management center 32, for creating a routing rule; and distributor 33, for sending the data collected to the designated target application 50 or directly inserting the data collected into a designated target database according to the routing rule.

Figure 6:
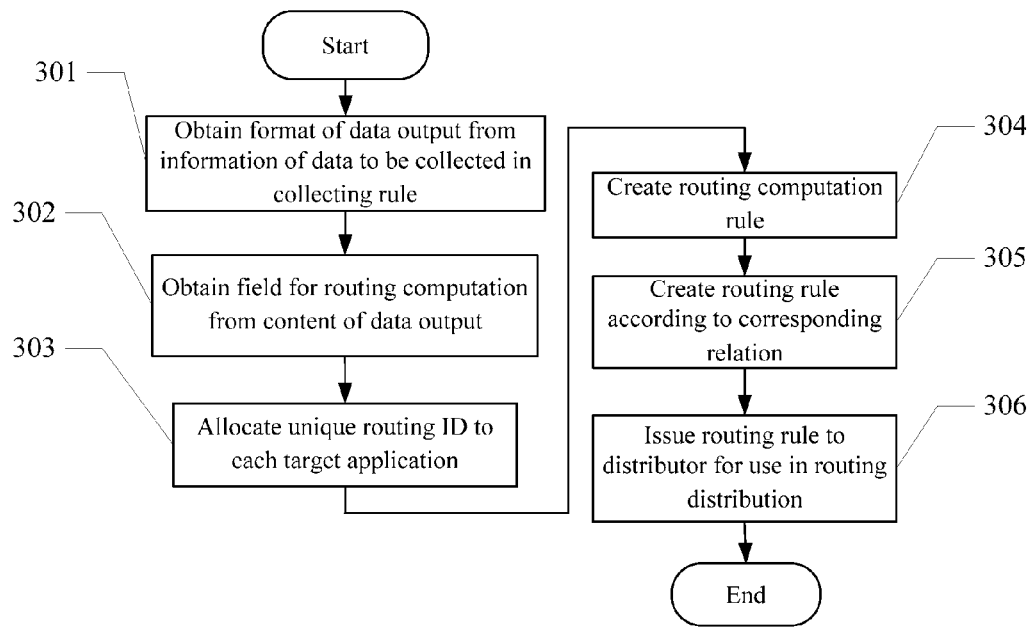
FIG. 6 is a flow chart of a process for creating a routing rule in the method for data synchronization, according to one embodiment of the invention.

Referring to FIG. 6, the process for creating a routing rule is as follows:

Block 301: The format of data output is obtained from the information of data to be collected in a collecting rule.

Block 302: The field for routing computation is obtained from the content of data output.

Block 303: A unique routing ID is allocated to each target application.

Block 304: A routing computation rule is created, that is, a correspondence between the value computed by the routing computation rule and the routing ID of the target application is created; the correspondence may be determined by various different algorithms, and each target application may correspond to a certain specific value computed by the routing computation rule, or it may correspond to a specific value range.

Block 305: A routing rule is created according to the correspondence.

When data arrives, the mapping and converting center 23 obtains the routing field in the data and determines the value of the routing field lies in the administration range of which target application, so as to determine to which target application should the data be sentBlock 306: The routing rule is issued to a distributor for use in distribution.

The monitoring unit 40 monitors the system error. If it finds that the mapping and converting process cannot be performed or the routing rule is lost and so on, it sends an alert immediately and notifies the administrator to check the error in time.

Figure 7:
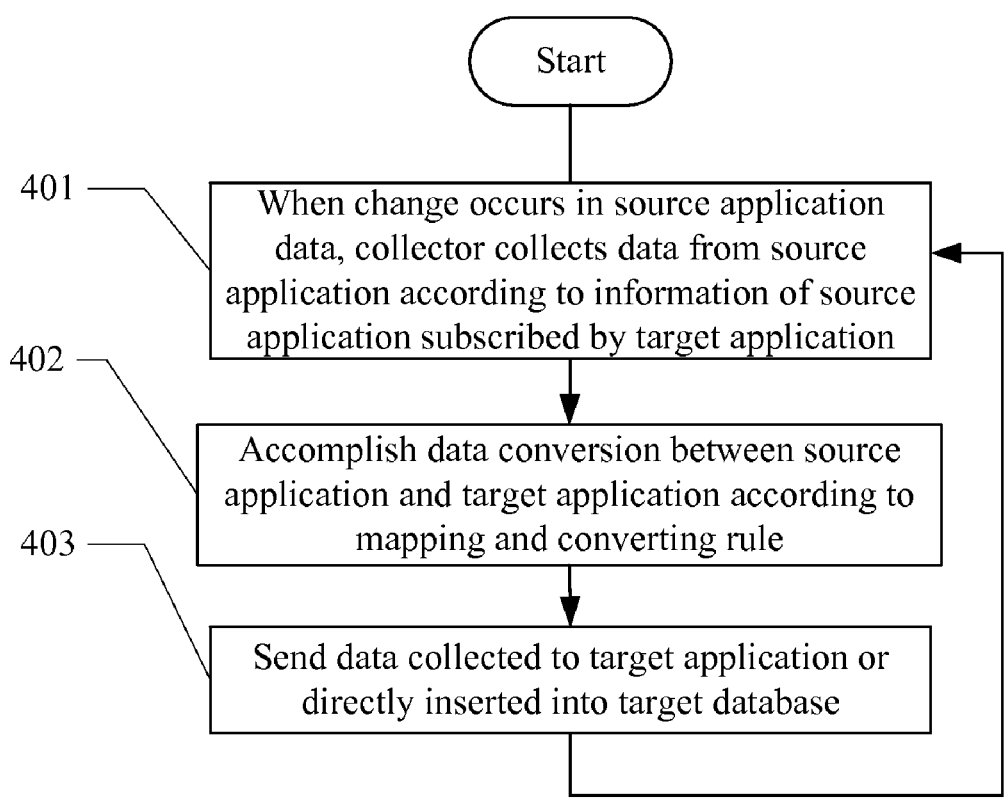
FIG. 7 is a general flow chart of the method for data synchronization, according to one embodiment of the invention.

Referring to FIG. 7, it shows a method for data synchronization according to one embodiment of the invention, which includes:

Block 401: When change occurs in the source application data, a collector collects data from the source application, according to the source application information subscribed by a target application;

Block 402: A mapping and converting unit accomplishes the data conversion between the source application and the target application, according to a mapping and converting rule; and Block 403: A distribution unit sends the data collected to the target application or directly inserts the data collected into a target database.

Figure 8:
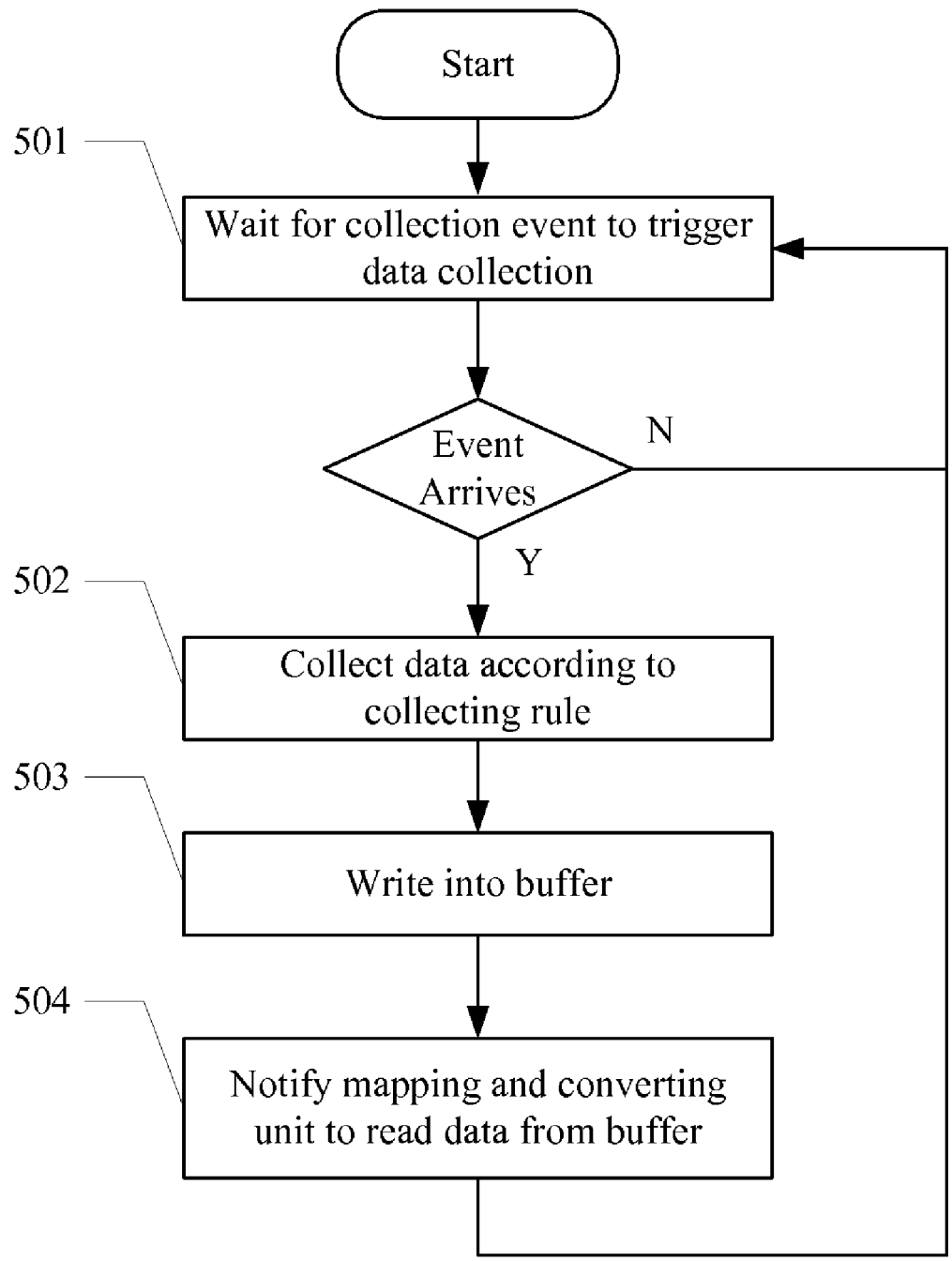
FIG. 8 is a flow chart showing a data collection process in the method for data synchronization, according to one embodiment of the invention.

Referring to FIG. 8, a process for data collection according to one embodiment of the invention is shown, which includes the following procedures.

Block 501: a collector waits for a collection event to trigger data collection;

Block 502: The collector corresponding to a collection triggering event detects that change occurs in the source application data, and it selects a collecting rule to collect the designated data;

A corresponding filtration condition may be preset, and data changes that meet the filtration condition will be ignored; in other words, when change occurs in these data, no collection event will be triggered.

Additionally, the collector corresponding to a collection triggering event may also send a User Datagram Protocol (UDP) packet to a mapping and converting unit and notify the mapping and converting unit to be prepared for data conversion.

Block 503: After the collector collects the data, it writes the data into a buffer and the data waits to be obtained by the mapping and converting center. Here, the buffer may be a data sheet, in which data to be synchronized are stored in sequence. The buffer may clear the content after synchronization is accomplished.

During data collection, the collector may write the collected data to the buffer in the unit of transaction. Wherein, collection in the unit of transaction means that a transaction ID and operation sequence number field will be added to the operational procedure information of each line of collection record, as a basis for guaranteeing the integrity of transaction data.

Block 504: The collector notifies the mapping and converting unit to read data from the buffer, and then waits for the next triggering event. After the mapping and converting unit receives the notification from the collector, it reads the data.

Figure 9:
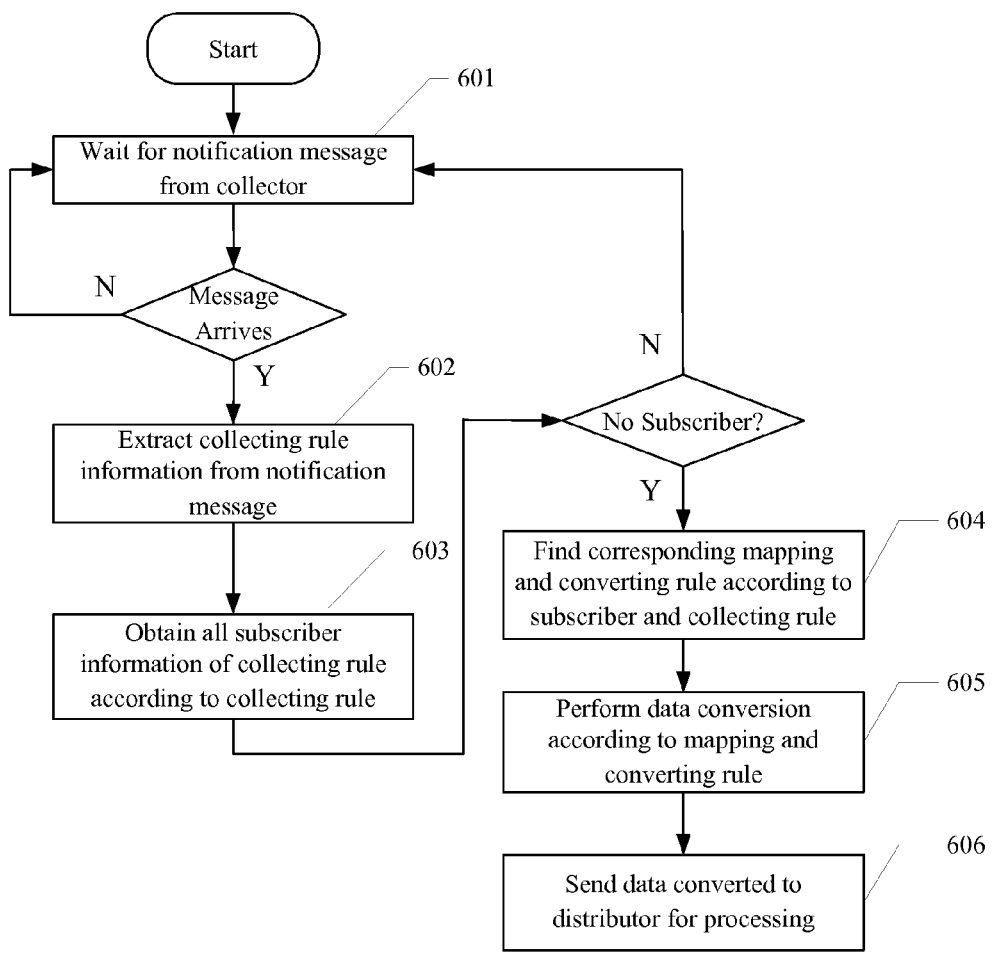
FIG. 9 is a flow chart showing a data mapping and converting process in the method for data synchronization, according to one embodiment of the invention.

The mapping and converting unit accomplishes the data conversion between the source application and the target application according to a mapping and converting rule. Referring to FIG. 9, the specific process includes the following procedures:

Block 601: A mapping and converting unit waits for a notification message from a collector; after the message arrives, it turns to Block 602; otherwise, it continues to wait.

The mapping and converting unit may listen to the notification message from the collector via a specific port.

Block 602: The collecting rule information is extracted from the notification message.

Block 603: All the subscriber information of the collecting rule, i.e. the target application information, is obtained from the collecting rule information; if there is no subscriber, the procedure returns to Block 601 and continues to wait for the next notification message; otherwise, it turns to Block 604.

Block 604: The mapping and converting unit finds the corresponding mapping and converting rule, according to the subscriber and the collecting rule.

Block 605: The collected data is converted according to the mapping and converting rule; in other words, the source application data is converted into data that can be identified by the target application.

Block 606: The data converted is sent to a distributor for processing. The data converted may be packaged in transaction operation sequence; in other words, these data may be arranged in the sequence of the original operations in the source application and then packaged. At this point, the transaction ID and operation sequence number are attached to the header of the data packet; and the data is forwarded to the distributor after being packaged. For all the subscribers, Block 604 to Block 606 need to be performed in turn, until all the subscribers are processed; then, the procedure returns to wait for the next notification message.

Figure 10:
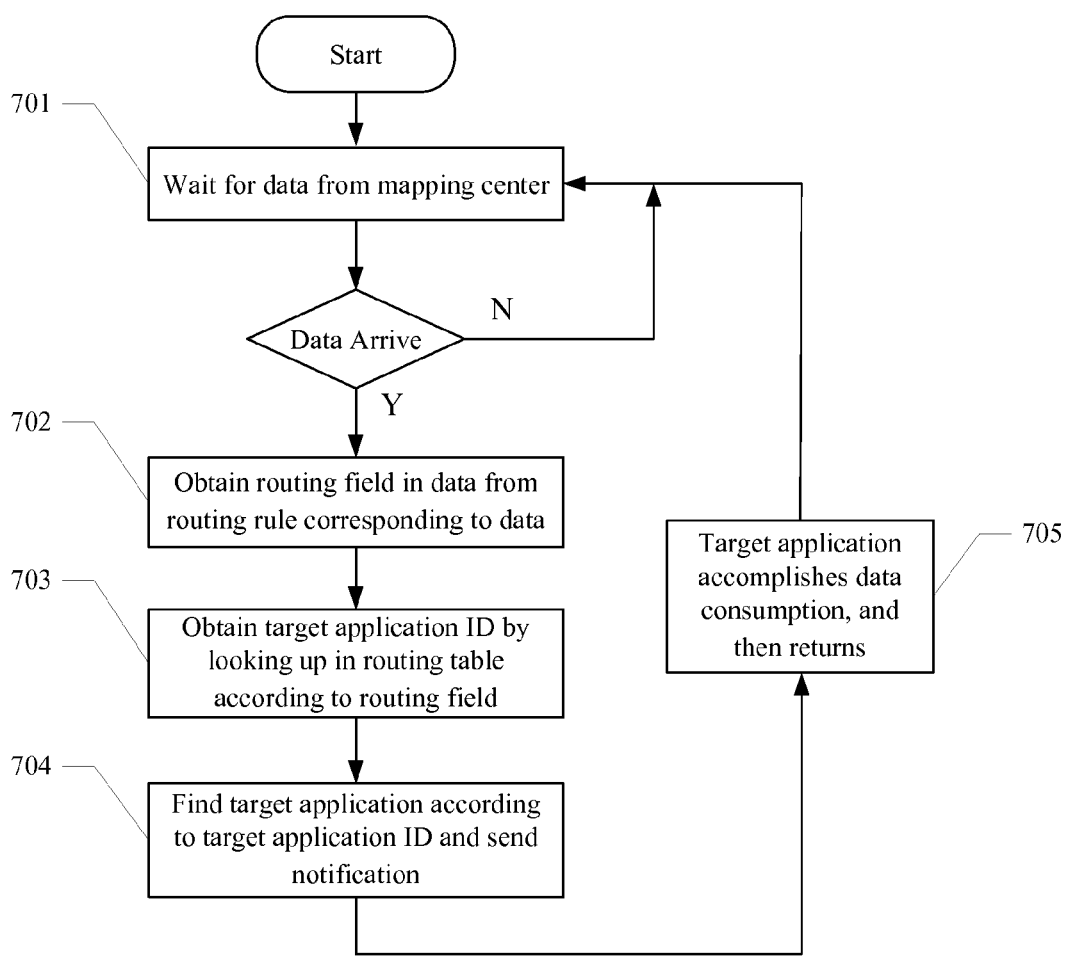
FIG. 10 is a flow chart showing a routing distribution process in the method for data synchronization, according to one embodiment of the invention.

In the above Block 403, the distribution unit sends the data collected to a designated target application or directly inserts the data collected into a designated target database according to a routing rule. Referring to FIG. 10, it shows a distribution process according to one embodiment of the invention, which includes:

Block 701: waiting for the data from a mapping center;

Block 702: After the distribution unit receives the data converted by the mapping and converting unit, the routing field is obtained from a routing rule corresponding to the data;

Block 703: The target application ID of the data is obtained by looking up in a routing table according to the routing field;

Block 704: The target application is found according to the target application ID and a notification is sent; and the data is written into a buffer specified by the target application waiting to be obtained by the target application, or the data is directly inserted into a target database; and Block 705: The target application accomplishes data consumption, and then the process returns to Block 701.

The target application first resolves the data packet received and obtains the complete synchronized data arranged in transaction operation sequence. Additionally, if the target application is a database, the data converted may also be directly inserted into the target application.

Moreover, the above procedures may also be monitored when each of the procedures is performed, so that the correctness of each procedure may be guaranteed.

It can be seen from the above description that, in the embodiments of the invention, by designing a set of simple but effective system and method for data synchronization, the problems in the prior art can be solved that the data synchronization efficiency is low, realtime processing and the integrity of synchronization transaction data cannot be guaranteed and data cannot be synchronized to target applications interested in it. The embodiments of the invention have the following technical effects generated for solving the problems in the prior art:

1) The subscription relationship of the target application on the source application and the type of data to be collected are specified by setting a specific data collection rule, so that the range of data collection will be reduced to a single source application, and even to a specific data object of the source application. Data variation of the source application under the collecting rule will trigger an operation of data synchronization, thus "On-Demand Synchronization" may be realized; at the same time, because only data needed is collected, not all the data changes of the source application will cause a collection and synchronization process, thus volume of data to be synchronized may be lowered greatly, network load may be alleviated, and network smoothness and network stability may be guaranteed.

2) A collected data filtration mechanism is employed, that is, a filtration condition is set in the collecting rule. If some contents meet or do not meet the condition, these content will be ignored; in other words, it may be set that filtration is carried out when a certain condition is met, or it may be set that filtration is carried out when a certain condition is not met. Thus, the complexity of the synchronization operation may be further lowered, and the volume of data to be synchronized may be reduced.

3) In the embodiments of the invention, after a collection action is triggered and the collection action is completed, the mapping and converting center is notified via a message, so that a realtime notification mechanism of data synchronization can be established, and realtime synchronization can be guaranteed.

4) In the embodiments of the invention, data is collected in the unit of transaction, and the collected data is packaged in transaction operation sequence in the mapping and converting center; at the same time, the packaged data is resolved in the target application and data of the same sequence will be obtained, so that the integrity of data synchronization can be guaranteed.

5) According to the invention, the subscription relationship may be modified, thereby target applications interested in the data may be added, and the range of data synchronization may be increased or reduced as required practically, so that the flexibility and extensibility of synchronization and information sharing can be improved greatly.

6) In the embodiments of the invention, a mapping and converting unit is employed and a mapping and converting relationship is established between the source application and the target application, thus the problem that data cannot be shared between the source application and the target application due to different data format or system can be better solved.

7) In the embodiments of the invention, a collection configuration interface, a design operating interface and a routing management interface are designed for providing functions of configuring a collecting rule, a mapping and converting rule and a routing rule, respectively; therefore, the workload and complexity of development can be lowered greatly.

8) The system for data synchronization according to the embodiments of invention has a wide range of application and little technical limitation. Therefore, it may be easily applied to an enterprise and even new and old target applications between enterprises. As a result, the existing investment of the enterprises can be protected to the maximum extent.

As described above, in the embodiments of the invention, for an old source application, a trigger will be created on the related database table to perceive data variation. But in the scope of the embodiments of the invention, there may be many other modes for perceiving data variation; for example, for a source application that employs a data service platform, a change notification mechanism may be used in place of a trigger.

The embodiments of the invention are applicable for the data synchronization in the field of intra-enterprise/extra-enterprise data system and telecommunication network, etc.

The system and method for data synchronization according to the invention have been illustrated in detail above, wherein specific examples are used for describing the principles and embodiments of the invention. Additional advantages and modifications will readily occur to those skilled in the art. Therefore, the invention in its broader aspects is not limited to the specific details and representative embodiments shown and described herein. Accordingly, various modifications and variations may be made without departing from the spirit or scope of the invention as defined by the appended claims and their equivalents.

What is claimed is:

1. A method for data synchronization, comprising:
    collecting data to be collected into a buffer in a unit of transaction from a source application according to source application information subscribed by a target application when a change occurs in the source application data, adding a transaction ID and operation sequence number field to the operational procedure information of each line of collection record when the data is written to the buffer;
    sending the data collected to the target application or directly inserting the data collected into a target database;

wherein before the process of sending the data collected to the target application or directly inserting the data collected into a target database, the method further comprises:

converting the source application data collected into data that can be identified by the target application according to a preset mapping and converting rule;

wherein the process of converting the source application data collected into data that can be identified by the target application according to a preset mapping and converting rule comprises:

obtaining the subscriber information corresponding to the data in the buffer according to a pre-established collecting rule, wherein the collecting rule comprises target application information, source application information subscribed by the target application and information of data to be collected;

obtaining the corresponding mapping and converting rule according to the subscriber information; and mapping the data in the buffer and converting the source application data into data that can be identified by the target application according to the mapping and converting rule.

2. The method for data synchronization according to claim 1, wherein, the mapping and converting rule is created as follows:

obtaining the source application information in the collecting rule;

obtaining the write interface of the target application and the sequence and type of all the interface parameters inside the target application according to the target application information in the collecting rule, and the data format of the collection output;

creating a mapping and converting relation between the interface parameter of the target application and the source application information; and issuing the mapping and converting relation.

3. The method for data synchronization according to any one of claims 1, wherein, the data collected is sent to a designated target application or directly inserted to a designated target application according to a routing rule.

4. The method for data synchronization according to claim 3, wherein, the routing rule is created as follows:

obtaining the format of data output from the information of data to be collected in the collecting rule;

obtaining the field for routing computation from the content of data output;

allocating a unique routing ID to each target application;

creating a routing computation rule;

creating a routing rule according to the routing computation rule; and issuing the routing rule.

5. The method for data synchronization according to claim 1, wherein, the collecting rule is created as follows:

obtaining the description data of a service object in the source application;

defining or modifying the source application information subscribed by the target application and the information of data to be collected according to the description data of the service object; and issuing the collecting rule.

6. The method for data synchronization according to claim 5, wherein, the process of defining or modifying the source application information subscribed by the target application and the information of data to be collected according to the description data of the service object comprises:

selecting the attribute of description data item of the service object as a subscription item; and defining the description data item of the service object as the content collected.

7. The method for data synchronization according to claim 1, further comprising:

defining a collecting and filtering condition; and disabling the triggering of the collection event when change occurs in source application data that meets the collecting and filtering condition.

8. A system for data synchronization, comprising:

a data collection unit, adapted to collect data to be collected into a buffer in the unit of transaction from a source application according to the source application information subscribed by a target application when a change occurs in the source application data, and add a transaction ID and operation sequence number field to the operational procedure information of each line of collection record when the data is written to the buffer;

a distribution unit, adapted to send the data collected by the data collection unit to the target application or directly insert the data collected into a target database;

a mapping and converting unit, adapted to convert the source application data collected by the data collection unit into data that can be identified by the target application according to a preset mapping and converting rule;

wherein, the mapping and converting unit comprises:

a mapping and converting setter, adapted to set a mapping and converting rule; and a mapping and converting center, adapted to convert the source application data collected by the data collection unit into data that can be identified by the target application according to the mapping and converting rule and package the data converted in transaction operation sequence.

9. The system for data synchronization according to claim 8, further comprising:

a collection controller, adapted to set a collecting rule and control the data collection unit.

10. The system for data synchronization according to claim 8, wherein, the mapping and converting unit further comprises a port adapted to listen to a notification message from the data collection unit.

11. The system for data synchronization according to claim 8, wherein, the distribution unit comprises:

a data routing management center, adapted to create a routing rule; and a distributor, adapted to send the data collected to a designated target application or directly insert the data collected into a designated target database according to the routing rule.

* * * * *